United States Patent [19]

Luvisotto

[11] Patent Number: 4,865,255
[45] Date of Patent: Sep. 12, 1989

[54] SELF-CONTAINED, MOBILE SPRAYING APPARATUS

[76] Inventor: Roy G. Luvisotto, R.R. #3,, Essex, Ontario, Canada, N8M 2X7

[21] Appl. No.: 128,101

[22] Filed: Dec. 3, 1987

[51] Int. Cl.$^4$ .............................................. B05B 9/00
[52] U.S. Cl. .................................... 239/149; 239/172; 239/722; 239/530; 239/302
[58] Field of Search ............... 239/149, 146, 172, 302, 239/375, 379, 525, 530, 722; 222/626

[56] References Cited

U.S. PATENT DOCUMENTS

| | | | |
|---|---|---|---|
| 1,167,297 | 1/1916 | Hayes | 239/530 |
| 1,346,750 | 7/1920 | Herman | 239/530 |
| 2,627,438 | 2/1953 | McNair | 239/172 X |
| 2,989,245 | 6/1961 | Matthewson | 239/525 X |
| 3,265,308 | 8/1966 | Hopkins | 239/172 |
| 3,837,539 | 9/1974 | Schlegel | 222/626 X |
| 3,940,065 | 2/1976 | Ware et al. | 239/146 |
| 4,176,793 | 12/1979 | Heinrich | 239/407 |
| 4,408,720 | 10/1983 | Anderson et al. | 239/149 |
| 4,618,099 | 10/1986 | Nagao et al. | 239/332 |
| 4,621,770 | 11/1986 | Sayer | 239/310 X |

FOREIGN PATENT DOCUMENTS 2102662  2/1983  United Kingdom ................ 239/146

Primary Examiner—Andres Kashnikow
Assistant Examiner—Patrick N. Burkhart
Attorney, Agent, or Firm—Gifford, Groh, Sheridan, Sprinkle and Dolgorukov

[57] ABSTRACT

A sprayer and self-contained, mobile pumping apparatus for spraying liquid herbicides, insecticides, fungicides, fertilizers and the like. The sprayer includes an adjustable nozzle, a grip, and an on-off switch. The pumping apparatus includes a supporting cart, wheels, upper and lower support shelves, a removable liquid storage tank resting upon the upper shelf, a rechargeable battery and pump resting upon the lower shelf, and disconnectable liquid lines connecting the tank with the pump and the pump with the sprayer.

18 Claims, 2 Drawing Sheets

SELF-CONTAINED, MOBILE SPRAYING APPARATUS

BACKGROUND OF THE INVENTION

I. Field of the Invention

The present invention relates generally to mobile sprayers. More particularly, the present invention relates to a mobile sprayer which is capable of being moved from one area to another and operated by one person.

II. Description of the Relevant Art

The relevant art is described hereinbelow.

U.S. Pat. No. 3,940,065 issued in 1976 to Ware et al entitled "PORTABLE SPRAYING APPARATUS" discloses a paint spraying apparatus comprising a wheeled frame of low clearance, an electrical plug for plugging the device into a 110 volt AC outlet, a drive motor and a paint container resting upon a paint container shelf attached to the frame.

U.S. Pat. No. 4,176,793 issued in 1979 to Heinrich entitled "ELECTRIC CLUTCH CONTROL" discloses an electrical control mechanism designed for application with a high pressure pump system utilizing a pistol-like structure having the electrical control components provided therein.

U.S. Pat. No. 4,618,099 issued in 1986 to Negao et al entitled "ELECTRIC SPRAY" discloses an electric spray unit comprising a nozzle member, a spray casing which accommodates a pump, a motor for driving the pump, and batteries.

U.S. Pat. No. 4,621,770 issued in 1986 to Sayen entitled "PLANT WATERING/MISTING DEVICE" discloses a hand-carried spraying device including a nozzle portion and a body portion. In one embodiment, the body is hand-carried. In another embodiment, the body is provided with small wheels, thereby restricting below-body clearance.

There are problems and disadvantages attendant the prior art techniques. For example, the known art fails to combine high mobility with a large liquid holding capacity. This lack of mobility is attributable to the low clearances of the known devices having wheels, rendering them impractical for travel over uneven terrain such as may be found in orchards or the like.

Furthermore, none of the known devices provide the advantage of producing high output pressure by means of a relatively small motor. The present invention accomplishes this by providing a large tank over the pumping means, whereby a continuous positive fluid pressure is provided at the inlet of the pumping means. In addition to providing improved pressure output, this unique arrangement effectively eliminates the need for priming and avoids the loss of prime altogether.

SUMMARY OF THE INVENTION

The present invention provides a self-contained, mobile spraying apparatus for spraying liquid herbicides, insecticides, fungicides, fertilizers or the like. The invention includes an apparatus cart having two relatively large wheels dimensioned to permit considerable clearance between the base of the cart and the uneven terrain being traversed. The cart further includes an upper support shelf provided with an interchangeable liquid storage tank thereon and a lower support shelf provided with a liquid pumping means and rechargeable storage battery. The pumping means delivers liquid under pressure to a hand-held spraying device.

An object of the present invention is to provide a self-contained mobile spraying apparatus for spraying liquid herbicides, insecticides, fungicides or fertilizers.

Another object of the present invention is to provide such a device which may accommodate liquid storage tanks of various sizes.

Still another object of the present invention is to provide such a device which is readily dissambled to facilitate easy cleaning.

Yet another object of the present invention is to provide such a device which is comprised of a minimum number of parts thereby simplifying assembly, manufacture and repair.

A further object of the present invention is to provide such a device which is capable of carrying a large amount of liquid at one time.

Yet another object of the present invention is to provide such a device which produces a maximum pressure utilizing minimum electrical energy by constructing the apparatus with the tank over the pump so as to take full advantage of the positive pressure head provided thereby.

Still another object of the present invention is to provide such a device which eliminates the loss of prime and priming difficulties.

The above and other objects, advantages and features of the present invention will become more apparent from the following detailed description when read in conjunction with the accompanying drawings.

DETAILED DESCRIPTION OF THE PREFERRED EMBODIMENTS

FIGS. 1-4 show a preferred embodiment of the present invention. While the configuration according to the illustrated embodiment is preferred, it is envisioned that alternate configurations of the present invention may be adopted without deviating from the invention as portrayed. The preferred embodiments are discussed hereafter.

Figure 1:
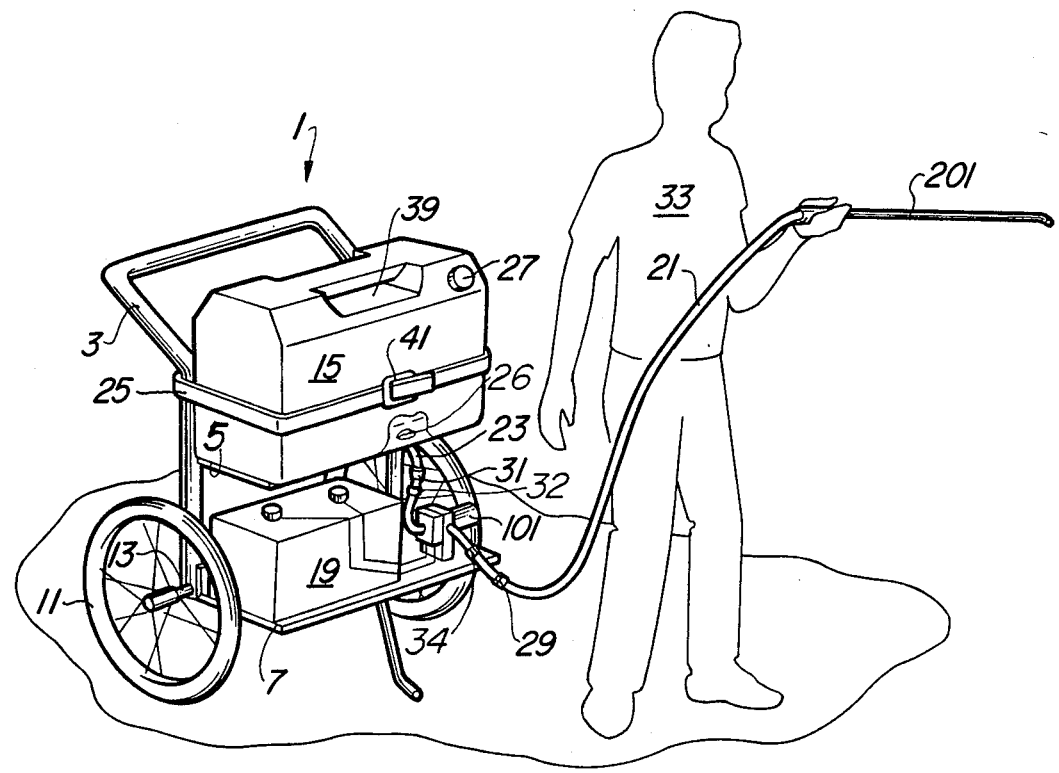
FIG. 1 is a perspective view of an apparatus according to the present invention.

Referring to FIG. 1, there is shown the apparatus according to the preferred embodiment of the present invention as it would approximately appear in use. An operator 33, shown in silhouette form, holds a hand-held liquid sprayer 201 described more fully below. By means of flexible lines, the sprayer is connected with a mobile pumping assembly, generally indicated as 1. Assembly 1 is generally supported by a frame-constructed cart 3, although non-frame variations of this construction are conceivable and might include a molded cart of a polymerized material. The cart 3 is conveniently mobilized by wheels 11 which are rotatably fitted to cart 3 by axles 13. One of the particularly novel features of the present invention is the clearance defined between the base of the cart 3 and the ground, which in all likelihood will be rough and uneven, as the present invention is designed for use in orchards, gardens, etc. Preferably the wheels 11 are of such dimension so as to create a clearance of between 10 cm and 30 cm.

Also provided as part of the cart 3 is an upper support shelf 5 and a lower support shelf 7. Preferably, but not exclusively, these shelves span the approximate width of cart 3.

Provided on upper shelf 5 is a liquid storage tank 15 shown in its preferred molded form comprised of a polymerized material and having a handle 39 molded therein. Filling ports are provided, shown here as inlet 27.

Tank 15 may be of a variety of shapes and sizes, thus offering one of the other novel aspects of the present invention. Preferably tank 15 has a 5 gallon capacity, depending upon the liquid to be sprayed. Different tanks may be provided for different liquids to eliminate the possibility of contamination of the fluid.

Tank 15 substantially rests upon the upper shelf 5 and is removably secured by belt 25 which is releasably fastenable by means of buckle 41. An outlet (not shown) is provided at the lowermost portion of tank 15. This outlet may be fitted with a filter 26 to eliminate particulates from exiting tank 15 and clogging the spray system.

Pumping is accomplished by means of liquid pump 101, described more fully below. Pump 101 is strategically fitted to lower shelf 7, thereby offering many operational advantages. At least two notable advantages may be identified regarding this arrangement. First, priming is rendered unnecessary, because the pump will be continually primed by tandk 15 situated overhead. Second, a positive pressure is provided so as to require less pumping on the part of pump 101.

To provide energy to pump 101, a variety of energizing means may be provided, although preferably a readily available, easily recharged 12 volt DC automotive battery 19 is provided. A battery cover (not shown) may be preferably provided to protect the battery 19 from the environment and to prevent the possible dripping of liquid from the tank thereon. Pump 101 is selectively engaged and disengaged by a switch 215 (shown in FIG. 4) preferably provided in sprayer 201, although the switch may as well be mounted on cart 3. Situated on cart 3, the operator may selectively engage or disengage the sprayer while simultaneously pulling cart 1, allowing him to spray as he walks.

Interconnecting tank 15, pump 101 and sprayer 201 are lengths of chemical-resistant flexible line. Preferably provided between tank 15 and pump 101 is a first line 23 which may be fitted with a quick disconnect fitting 31 to facilitate convenient removal of tank 15 from cart 3. Additionally, an in-line filter 32 may be provided in first line 23 to assure the pumping of particle-free liquid and to protect the pump from destructive particles. Between pump 101 and sprayer 201 is a second line 21 which also may be fitted with quick disconnect fitting 29 to facilitate convenient detachment of sprayer 201 from assembly 1. Additionally provided on second line 21 between pump 101 and sprayer 201 is a valve 34 which prevents the outflow of liquid due to the effect of siphoning when sprayer 201 is rested upon the ground or is disconnected at fitting 29. Alternatively, a valve (not shown) may be fitted in sprayer 201.

Figure 2:
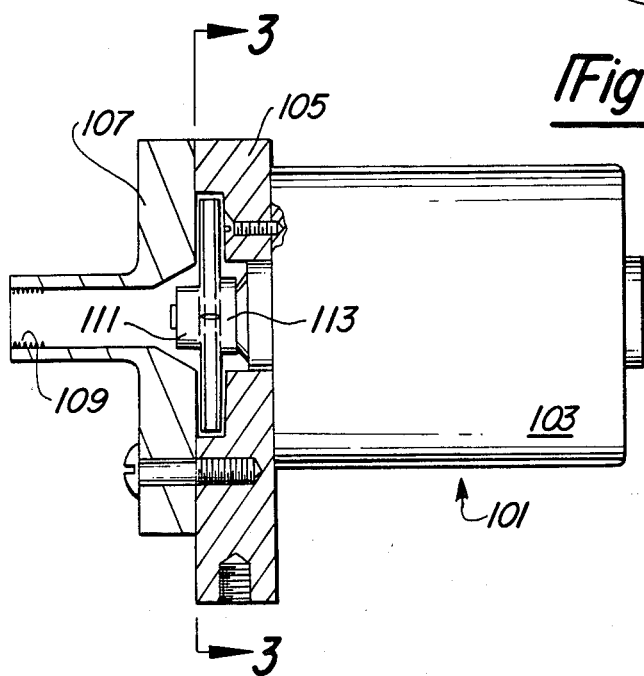
FIG. 2 is a partial cross-sectional view of the pumping means of the present invention.
Figure 3:
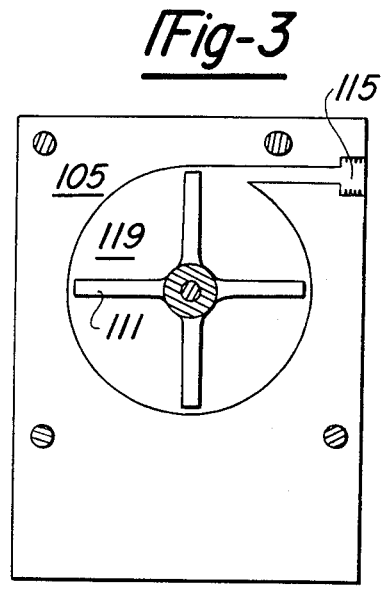
FIG. 3 is a cross-sectional view taken along lines 3—3 of FIG. 2.

Referring now to FIG. 2, there is shown a liquid pump, generally indicated as 101, according to the preferred embodiment of the present invention. Many variations of liquid pumps can be achieved without deviating from the present invention, although the present embodiment is preferred because of its simplicity and reliability.

Pump 101 is driven by conventional electric motor 103. Preferably motor 103 is a 12 volt DC motor which draws approximately 5 amperes and produces 10,300 RPM. With these specifications and with the tank situated above the motor, liquid output having a pressure of 32-40 PSI can be achieved. Motor 103 drives impeller 11 to accomplish the driving of liquid. Supporting motor 103 and housing impeller 111 in part is impeller housing 105 which may be more clearly seen in relation to impeller 111 by referring to FIG. 3 which shows the illustration of FIG. 2 along line 3—3. With reference thereto, impeller recessed region 119 can be readily viewed. The configuration of region 119 permits free rotation of impeller 111 therein, while liquid outlet 115 is defined for the forced escape of pressurized liquid therefrom.

Referring again to FIG. 2, between motor 103 and impeller 111 is provided seal 113 to prevent the passage of liquid from recessed region 119 into motor 103. While a number of seals may be effectively employed for this purpose, "V-Seals" (not a trademark) manufactured by GBSA Engineering are preferred.

To cover and thereby sealingly enclose impeller 111, impeller housing cover 107 is fittingly provided. Liquid inlet 109 is preferably defined so that incoming liquid is restrictively directed upon impeller 111, thereby minimizing cross-flows of liquid which would reduce the operating efficiency of pump 101.

Figure 4:
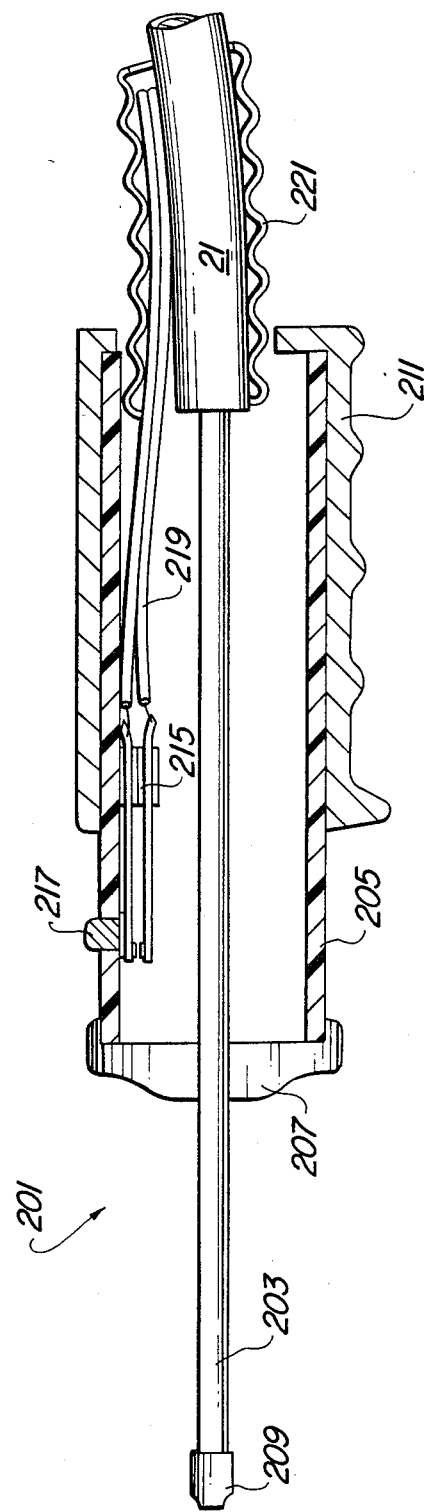
FIG. 4 is a cross-sectional view of the hand-held sprayer according to the present invention.

Referring now to FIG. 4, there is shown a preferred embodiment of sprayer 201. The configuration of sprayer 201 as illustrated is preferred, but may be reasonably varied without detracting from the features illustrated in the preferred embodiment, and such variation may conceivably be made without deviating from the basic principles espoused herein.

Sprayer 201 is configured so as to be readily and securely operated in one hand. As discussed, liquid is delivered to sprayer 201 from pump 101 by second line 21 which fastens to and terminates at rigid sprayer line 203. Adjustable spray nozzle 209 is preferably provided at the end of line 203, thus allowing for selective manipulation of spray distance, amount, pattern, etc.

Sprayer line 203 is substantially housed in sprayer housing 205 which, except for on-off contact switch 215, its associated button 217, lead wires 219, and line 203, is substantially hollow. Housing cap 207 preferably closes housing 205 and supplies peripheral support for line 203. Switch 215, while preferably provided integrally within sprayer 201, would, as mentioned above, as well be mounted elsewhere, including on cart 3. However, according to the preferred embodiment of the invention, switch 215 is provided herein so the operator (not shown) may readily depress button 217 with his finger or tumb.

Housing 205 is additionally provided with, and is partially enclosed by, sprayer grip 211, which is composed of a firm, yet yieldable polymerized material. In addition to being formed so as to provide a confortable gripping means for the operator, grip 211 receives and firmly holds flexible line protector 221 which is fitted about the terminal portion of line 21 to prevent lead wires 219 from becoming tangled. Additionally, line protector 221 improves the aesthetic appeal of sprayer 201 by giving the same a finished appearance.

In use, the spray apparatus operator pulls the assembly to the preferred location for spraying. So situated, the sprayer is grasped, directed to the selected region, the one-off buttom is depressed, and controlled spray begins. If the sprayer is inadvertently or intentionally allowed to rest upon the ground, liquid outlow is prevented by the one-way check valve. After spraying, the operator removes the apparatus to an appropriate site for storage. The liquid tank may be radily disconnected, removed and cleaned with the least amount of inconvenience. Recharging, if necessary, is accomplished with ease; the tank is replaced, reconnected and refilled, and the apparatus is ready for its next use.

Having described the present invention, however, many modifications thereto will become apparent to those skilled in the art to which it pertains without deviation from the spirit of the invention as defined by the scope of the appended claims.

I claim:

1. A self-contained, mobile spraying apparatus for spraying any of liquid herbicide, insecticide, fungicide or fertilizer, comprising:
   a hand-held liquid sprayer;
   a switch for selectively controlling the spray of said spraying apparatus, said means for controlling mounted to said hand-held liquid sprayer;
   a pumping assembly for delivering liquid under pressure to said liquid sprayer for spraying therefrom, said pumping assembly including:
   a substantially vertical cart having an upper portion and a lower portion and being fitted with a pair of wheels of such placement and dimension so as to facilitate transversal of uneven terrain;
   a removable liquid storage tank having an inlet and an outlet fitted to said upper portion of said cart;
   means for pumping liquid situated below said tank at said lower portion of said cart, said pumping means having an inlet and an outlet and having a first flexible line interconnecting said inlet of said pumping means with said outlet of said storage tank, and having a second flexible line interconnecting said outlet of said pumping means with said han-held liquid sprayer;
   said sprayer including: p1 a rigid sprayer line having a liquid inlet fitted to said second flexible line and a liquid outlet having a sprayer nozzle fitted thereto;
   a sprayer housing body housing said rigid sprayer line, said switch and an end portion of said second flexible line fitted to said sprayer line;
   a flexible hose protector substantially fitted between said sprayer housing and said end portion of said second flexible line; and
   a sprayer hand grip partially enclosing said sprayer housing.

2. The self-contained, mobile spraying apparatus according to claim 1 wherein:
   said liquid storage tank is removably held to said cart by an adjustable, flexible belt having a first part with one end thereof fixed to said cart, a second part with one end thereof fixed to said cart, and means for removably attaching said first part to said second part.

3. The self-contained, mobile spraying apparatus according to claim 1, wherein said pumping means further comprises:
   one or more blades for impelling said liquid out of said pumping means;
   a pump motor having a drive shaft with said blades fixed at one end thereof;
   an impeller housing provided on said lower portion of said cart having an inner side and an outer side and a drive shaft aperture interconnecting said inner side and said outer side, said pump motor being fixed to said outer side and having its drive shaft rotatably provided through said aperture, said inner side having a recessed region to accommodate said blades fixed to said drive shaft; and
   an impeller housing cover sealingly fitted to said impeller housing having said inlet provided therein, said housing cover substantially enclosing said recessed region of said impeller housing.

4. The self-contained, mobile spraying apparatus according to claim 1, wherein said first flexible line is fitted with a first quick disconnect fitting and said second flexible line is fitted with a second quick disconnect fitting.

5. The self-contained, mobile spraying apparatus according to claim 1, wherein said liquid storage tank is fitted with a filter at said outlet.

6. The self-contained, mobile spraying apparatus according to claim 1, wherein said first flexible line is fitted with a filter.

7. The self-contained, mobile spraying apparatus according to claim 1 wherein said liquid storage tank is removably held to said cart by an adjustable, flexible belt having a first part with one end thereof fixed to said cart, a second part with one end thereof fixed to said cart, and means for removably attaching said first part to said second part.

8. The self-contained, mobile spraying apparatus according to claim 1, wherein said pumping means further comprises:
   one or more blades for impelling said liquid out of said pumping means;
   a pump motor having a drive shaft with said blades fixed at one end thereof;
   an impeller housing provided on said lower portion of said cart having an inner side and an outer side and a drive shaft aperture interconnecting said inner side and said outer side, said pump motor being fixed to said outer side and having its drive shaft rotatably provided through said aperture, said inner side having a recessed region to accommodate said blades fixed to said drive shaft; and
   an impeller housing cover sealingly fitted to said impeller housing having said inlet provided therein, said housing cover substantially enclosing said recessed region of said impeller housing.

9. The self-contained, mobile spraying apparatus according to calim 1, wherein said first flexible line is fitted with a first quick disconnect fitting and said second flexible line is fitted with a second quick disconnect fitting.

10. The self-contained, mobile spraying apparatus according to claim 1, wherein said liquid storage tank is fitted with a filter at said outlet.

11. The self-contained, mobile spraying apparatus according to claim 1, wherein said first flexible line is fitted with a filter.

12. The self-contained, mobile spraying apparatus according to claim 1, further comprising a rechargeable storage battery and interconnecting electric lines.

13. A self-contained, mobile spraying apparatus for spraying any one of liquid herbicide, insecticide, fungicide or fertilizer, comprising:

a substantially perpendicular cart having a first substantially horizontal support structure and a second substantially horizontal support structure, said cart being further provided with a pair of wheels fitted thereto in such a manner and having such dimension so as to facilitate transversal of uneven terrain;

an interchangeable liquid storage tank removably mounted to said cart and substantially supported by said first substantially horizontal support structure, said storage tank being composed of a polymerized material and having at least one handle formed therein, and further having a top side and a bottom side, said top side having an inlet and said bottom side having an outlet;

a hand-held spray unit for delivering and directing the spray of said liquid;

means for pumping said liquid, said pumping means being provided below said fluid storage tank so that continuous, positive pressure may be maintained on said liquid entering said pumping means, said pumping means being in fluid communication with said liquid storage tank by means of a first flexible liquid line and with said hand-held spray unit means by a second flexible line; and means for selectively energizing said pump, said means for energizing providing electric current to said pumping means;

said hand-held spray means including:

a switch for selectively engaging and disengaging said pumping means;

a rigid sprayer line having a liquid inlet fitted to said second flexible line and a liquid outlet having a sprayer nozzle fitted thereon;

a sprayer housing body housing said rigid sprayer line, said switch and an end portion of said flexible line fitted to said sprayer line;

a flexible hose protector substantially fitted between said sprayer housing and said end portion of said second flexible line; and a sprayer hand grip partially enclosing said sprayer housing.

14. The self-contained, mobile spraying apparatus according to claim 13, wherein:

said liquid storage tank is removably held to said cart by an adjustable, flexible belt having a first part with one end thereof fixed to said cart, a second part with one end thereof fixed to said cart and means for removably attaching said first part to said second part.

15. The self-contained, mobile spraying apparatus according to claim 13, wherein said pumping means further comprises:

one or more blades for impelling said liquid out of said pumping means;

a pump motor having a drive shaft fitted with said blade at one end thereof;

an impeller housing provided on said second substantially horizontal support structure and having an inner side and an outer side and a drive shaft aperture interconnecting said inner side and said outer side, said pump motor being fixed to said outer side and having its drive shaft rotatably provided through said aperture, said inner side having a recessed region to accommodate said blades fixed to said drive shaft; and an impeller housing cover sealing fitted to said housing having said inlet provided therein, said housing cover substantially enclosing said recessed region of said impeller housing.

16. The self-contained, mobile spraying apparatus according to claim 13, wherein said first flexible line is fitted with a first quick disconnect fitting and said second flexible line is fitted with a second quick disconnect fitting.

17. The self-contained, mobile spraying apparatus according to claim 13, wherein said liquid storage tank is fitted with a filter at said outlet.

18. The self-contained, mobile spraying apparatus according to claim 13, wherein said energizer means comprises a rechargeable storage battery and interconnecting electric lines.

* * * * *